United States Patent [19]

Field

[11] Patent Number: 4,876,444
[45] Date of Patent: Oct. 24, 1989

[54] PROTECTION FROM EXTRANEOUS LIGHT FOR LIGHT GUIDED VEHICLE

[75] Inventor: Bruce F. Field, Minneapolis, Minn.

[73] Assignee: Tennant Company, Minneapolis, Minn.

[21] Appl. No.: 164,880

[22] Filed: Mar. 7, 1988

[51] Int. Cl.⁴ .............................................. H01J 40/14
[52] U.S. Cl. .............................. 250/214 AL; 250/561; 180/169
[58] Field of Search ......................... 250/214 AL, 561; 356/141, 152; 180/167–169; 901/47; 364/424.02; 318/587

[56] References Cited

U.S. PATENT DOCUMENTS

| 3,529,214 | 9/1970 | Corn | 250/214 AL |
| 3,665,224 | 5/1972 | Kelsey | 250/214 AL |
| 4,629,941 | 12/1986 | Ellis et al. | 250/214 AL |
| 4,645,975 | 2/1987 | Meitzler et al. | 250/214 AL |

Primary Examiner—Edward P. Westin
Assistant Examiner—Khaled Shami
Attorney, Agent, or Firm—Kinzer, Plyer, Dorn, McEachran & Jambor

[57] ABSTRACT

An automated guided vehicle uses a scanning laser unit having a laser transmitter and receiver to transmit laser signals and receive them reflected back from a series of targets. The reflected signals are used to guide the vehicle along a desired path. The laser unit includes a photodetector mounted near the laser receiver such that any extraneous light, such as sunlight, that strikes the laser receiver will also strike the photodetector. The photodetector converts the extraneous light into an electrical signal proportional to the amount of such light. The photodetector signal is compared to a threshold value which generally is slightly below an amount of extraneous light sufficient to confuse the laser unit. If the threshold value is exceeded, the photodetector signal is used to stop the vehicle or take other appropriate action.

9 Claims, 2 Drawing Sheets

PROTECTION FROM EXTRANEOUS LIGHT FOR LIGHT GUIDED VEHICLE

BACKGROUND OF THE INVENTION

There is a current trend toward the use of a laser beam to provide guidance for certain vehicles, thereby eliminating the need for an attendant to guide them. Such a system is described in co-pending U S. Pat. No. 4,790,402, which is owned by the assignee of the present invention.

U.S. Pat. No. 4,790,402 describes a vehicle on which is mounted a laser unit. This transmits a scanning beam which is intercepted and reflected by one of a series of retroreflective targets mounted along the intended pathway of the vehicle. The reflected beam returns to the laser unit on the vehicle and provides a course-corrective signal by means of which the vehicle is caused to follow a desired path.

U S. Pat. No. 4,647,784 describes another method by which a vehicle is navigated. This vehicle operates in an area in which are installed a plurality of retroreflective targets at known locations. The vehicle carries a laser unit which transmits a scanning beam. This strikes and is reflected back from two or more concurrently visible targets, and these reflected signals provide bearings which permit the vehicle's location to be determined by triangulation that is performed by an on-board computer.

In working with the vehicle of U.S. Pat. No. 4,790,402 it has been found that direct sunlight striking the laser unit can cause a false signal which may result in malfunctioning of the guidance system. Sunlight contains many frequencies, including the one which is being transmitted from and reflected back to the laser, so a beam of sunlight striking the laser may cause the same reaction as the laser beam reflected from a target. Since the target and the sunbeam are not necessarily at the same bearing from the vehicle, an undesired heading for the vehicle may result. It is surmised that a similar problem may be encountered by other vehicles utilizing a laser in their navigation. It also seems possible that strong light sources other than sunlight could cause false signals in a laser unit.

SUMMARY OF THE INVENTION

An ingenious and effective solution to this problem has been found. A photodetector is mounted on the laser unit of the vehicle of U.S. Pat. No. 4,790,402 so that the photodetector faces the same way as the laser. In normal operation the photodetector is inoperative, but when direct sunlight strikes the laser unit, it also strikes the photodetector, which then emits an electrical signal. This signal is used to override the laser control so it can not misdirect the vehicle.

In this particular instance, the signal from the photodetector is used to cause the vehicle to shut down, i.e., stop moving and stop its work functions. The vehicle goes into a waiting mode until the sunlight interference is removed, at which time the vehicle resumes normal operation. However, the photodetector signal could be used for any appropriate response, e.g., searching for an alternate target or continuing on its previous course, or any other response deemed appropriate.

The photodetector used is a silicon photovoltaic cell, which is commonly known as a solar cell. However, any other suitable photodetector device might be used. Examples might be photoresistors and various phototransistors. In any case, the sensitivity of the device should be adjusted to a level that will not override the reflected laser signal in normal ambient light, but will take control when a light signal is received which is strong enough to misguide the vehicle. The most common one is direct sunlight, but there may be others.

DESCRIPTION OF THE PREFERRED EMBODIMENT

Figure 1:
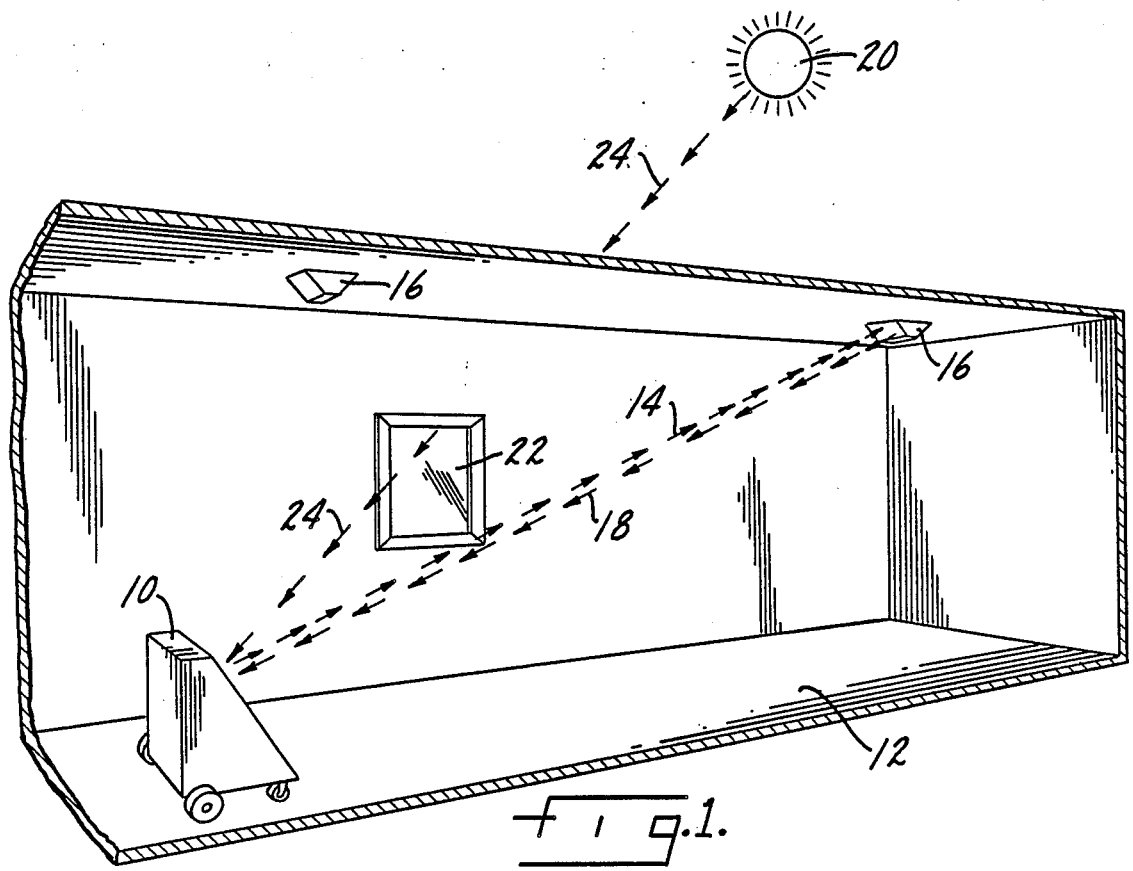
FIG. 1 is a perspective view of a laser guided mobile robot operating in a room which has sunlight entering through a window.

Referring to FIG. 1, mobile robot 10 is operating in a room designated as 12. Robot 10 is guided by a laser system as described in U.S. Pat. No. 4,790,402 the disclosure of which is incorporated herein by reference. A scanning laser beam 14 is emitted by a laser unit on the machine and is reflected back to the emitting unit by one of a plurality of ceiling-mounted retroreflective targets 16. The targets define a desired path for the robot. The reflected laser beam 18 provides course corrective signals to the mobile robot 10 so that it follows the desired path from target to target.

This system of navigation is effective and reliable under conditions of normal ambient lighting. However, if a strong light source of multiple wavelengths strikes the laser unit, the unit may misinterpret that light as a returning laser signal. The most common such light source is direct sunlight, but it is possible that strong lights of other types might have this same effect. Thus, in FIG. 1, the sun 20 shining through window 22 may create an erroneous signal by sending sunbeam 24 through the window so that it strikes the laser unit. In this case, the robot may turn toward the window rather than staying on course toward the next target.

Figure 2:
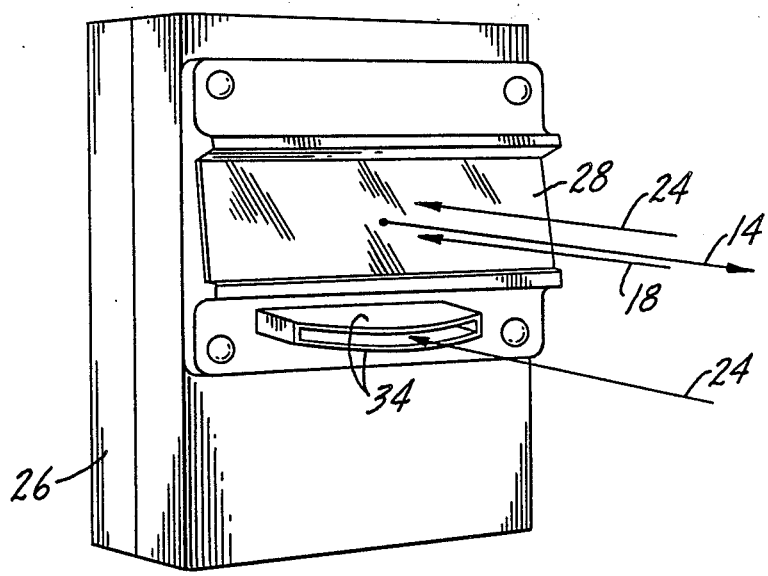
FIG. 2 is a perspective view of a suitable laser unit for use on a mobile robot. It is equipped with a photodetector and light shields in accordance with the present invention.

FIG. 2 shows a laser unit 26 which might be used on such a mobile robot. It is capable of emitting a laser signal and receiving back a reflected laser signal. It is equipped with a photodetector, not shown in FIG. 2, surrounded by sun shields 34, for sensing when direct sunlight is striking it. A suitable laser unit can be based on the Lasernet (TM) unit made by Namco Controls of Mentor, Ohio. The Lasernet (TM) unit is modified by adding a photodetector and sun shields. The laser unit 26 emits the narrow lase beam 14 and receives its reflected beam 18 through glass window 28. A broad sunbeam 24 which strikes the laser unit will strike the glass window 28 and the photodetector 32 which is mounted on the laser unit.

Figure 3:
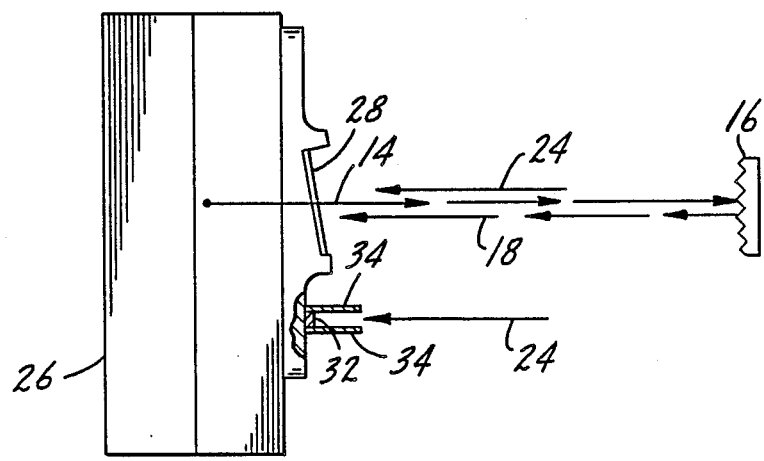
FIG. 3 is a side view of the same laser unit, showing the photodetector and light shields in section, a laser signal being emitted from the unit and reflected back to it from a target, and a beam of sunlight striking the laser receiver and the photodetector.

FIG. 3 shows a side view of the laser unit 26, with the photodetector 32 and sun shields 34 shown in section. Photodetector 32, which in this case is a photovoltaic cell, is mounted on the face of the laser unit. In place of a photovoltaic cell another photodetector might have been used, e.g., a photoresistor or a phototransistor. Light shields 34 limit the entry of stray sunlight and permit entry only of sunbeams which are essentially parallel to the laser beams.

Figure 4:
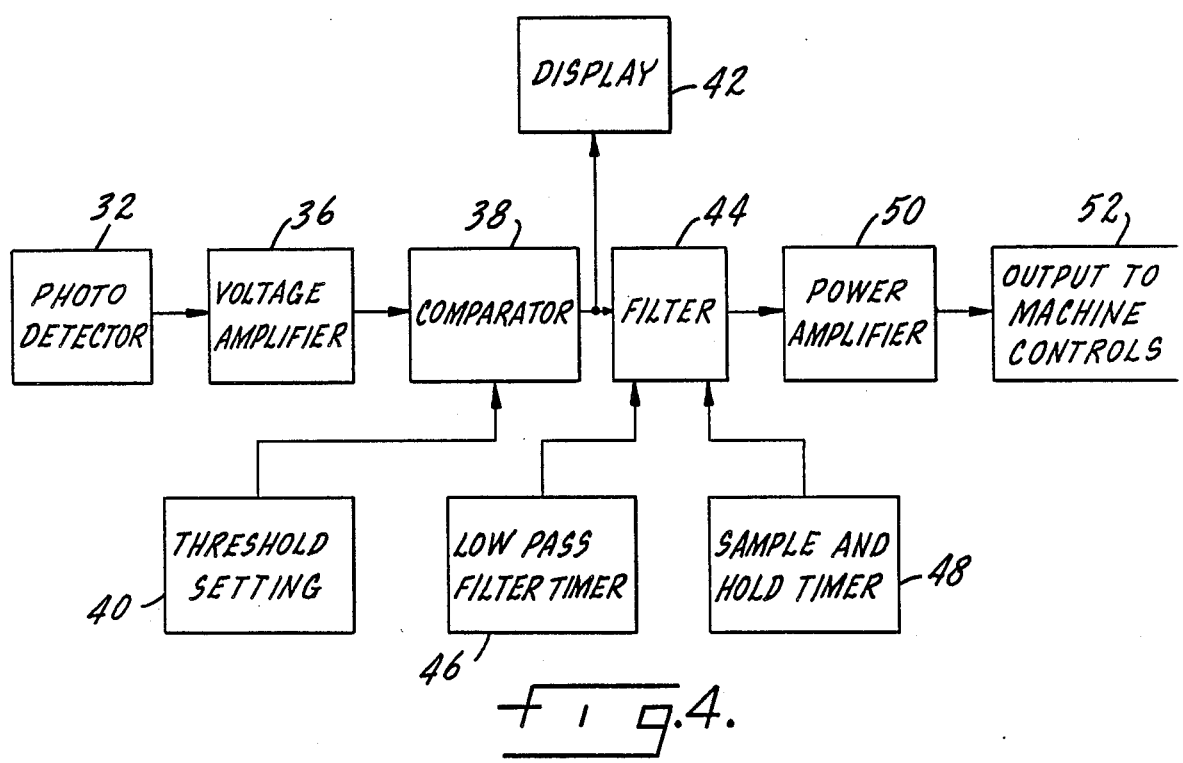
FIG. 4 is a block diagram of the electronic circuitry used with the photodetector.

FIG. 4 is a block diagram of the circuit involved. The photodetector 32 receives light from the sun or other extraneous source. It converts this to an electrical signal which is amplified by voltage amplifier 36 to a level which is usable in the circuit. This amplified signal is compared by comparator 38 to a selected threshold setting 40. The threshold is chosen to be slightly below the level of extraneous light that would trigger the laser unit to lock onto the sunbeam instead of onto the laser beam reflected from a target. If the extraneous light, as represented by the electrical signal from the photodetector, is below this value, there will be no output from comparator 38. However, if the extraneous light is above the threshold value, an interrupt signal will be passed to LED display 42 and to filter 44. If the interrupt signal is momentary, it will be stopped by low pass filter timer 46. However, if the interrupt signal continues for longer than a selected period of time, for example 0.3 seconds, it will be sampled and held by timer 48 for ten seconds. During this time, the movement and machine functions of the robot will be shut off by an override signal 52 which is amplified as necessary by power amplifier 50 and sent to the machine controls. Every ten seconds the timer 48 will re-sample the interrupt signal and will keep the robot shut down as long as an above-threshold interrupt signal is detected. Operation of the robot will resume when an above-threshold interrupt signal is no longer detected.

The invention has been described in terms of a navigation system for a mobile robot. However, it has general usefulness wherever a laser receiver used for any purpose can be confused by an extraneous light source such as the sun. Thus, a laser receiver on any equipment used outdoors or in other strong ambient light might beneficially use this invention. The threshold signal can be set to be compatible with the laser equipment being used, and the output signal can be used to actuate or trigger any type of response which might be suitable for the equipment in use.

I claim:

1. A laser beam detecting device for use in conjunction with one or more retroreflective targets, comprising a transmitter for emitting a laser beam, scanning means for traversing said emitted laser beam through a scanning plane, a traversing said emitted laser beam through a scanning plane, a receiver for detecting a laser beam reflected from one of said targets and converting it to an output signal, a photodetector mounted adjacent the receiver such that extraneous light striking the receiver only from a direction parallel to said scanning plane will also strike the photodetector, the photodetector producing a signal indicating the amount of extraneous light striking the device, and comparing means for comparing the photodetector signal to a predetermined threshold and generating an interrupt signal for overriding the output signal of the receiver when the threshold is exceeded.

2. The device of claim 1 further comprising a first timer means which permits the interrupt signal to override the output signal only when the threshold has been exceeded for a predetermined minium length of time.

3. The device of claim 2 further comprising a second timer means which maintains the interrupt signal for a predetermined length of time once the minium of the first timer means has been exceeded.

4. The device of claim 1 further comprising light shields mounted adjacent the photodector and arranged such that only light substantially parallel to the scanning plane of said laser beam is permitted to strike the photodetector.

5. In a laser beam detecting device for use in conjunction with one or more retroreflective targets, and having a transmitter for emitting a laser beam, scanning means for traversing said emitted a laser beam through a scanning plane, and having means for receiving a light beam reflected from one of said targets and converting it into an output signal, a method of preventing false output signals due to extraneous light sources, comprising the steps of:

detecting extraneous light impinging on the device adjacent the means for receiving the light beam only from a direction substantially parallel to said scanning plane;

comparing the amount of light detected with a predetermined threshold; and overriding the output signal when the threshold is exceeded.

6. The method of claim 5 wherein the light beam is a laser beam.

7. The method of claim 5 wherein the comparing step is further characterized by generating an interrupt signal for overriding the output signal of the receiver when the threshold is exceeded and timing the interrupt signal so as to permit the interrupt signal to override the output signal only when the threshold has been exceeded for a predetermined minimum length of time.

8. The method of claim 7 further characterized by maintaining the interrupt signal for a predetermined length of time once the minimum length of time has been exceeded.

9. The device of claim 1 wherein the photodetector is a silicon photovoltaic cell.

* * * * *